US009780706B2

(12) United States Patent
Allegrini et al.

(10) Patent No.: US 9,780,706 B2
(45) Date of Patent: Oct. 3, 2017

(54) MOTOR CONTROL CURRENT ZERO CROSSING DETECTOR

(71) Applicant: Allegro Microsystems, LLC, Worcester, MA (US)

(72) Inventors: Gianluca Allegrini, Musselburgh (GB); Thomas Ross, Howden (GB); James McIntosh, Longniddry (GB); Robert Douglas Christie, Fife (GB)

(73) Assignee: Allegro MicroSystems, LLC, Worcester, MA (US)

( * ) Notice: Subject to any disclaimer, the term of this patent is extended or adjusted under 35 U.S.C. 154(b) by 76 days.

(21) Appl. No.: 15/016,351

(22) Filed: Feb. 5, 2016

(65) Prior Publication Data
US 2017/0229986 A1 Aug. 10, 2017

(51) Int. Cl.
| G01R 31/02 | (2006.01) |
| H02H 3/04 | (2006.01) |
| H02H 7/08 | (2006.01) |
| H02K 11/00 | (2016.01) |
| H02P 6/18 | (2016.01) |
| H02P 6/08 | (2016.01) |

(52) U.S. Cl.
CPC ............... *H02P 6/18* (2013.01); *H02P 6/085* (2013.01)

(58) Field of Classification Search
CPC .................................. H02P 6/18; H02P 6/085
USPC ......................................................... 318/490
See application file for complete search history.

(56) References Cited

U.S. PATENT DOCUMENTS

| 5,616,996 | A | 4/1997 | Tang et al. |
| 5,627,447 | A | 5/1997 | Unsworth et al. |
| 5,811,949 | A | 9/1998 | Garces |
| 6,163,120 | A | 12/2000 | Menegoli |
| 6,198,256 | B1 | 3/2001 | Miyazaki et al. |
| 7,590,334 | B2 | 9/2009 | Yabusaki et al. |
| 7,747,146 | B2 | 6/2010 | Milano et al. |

(Continued)

FOREIGN PATENT DOCUMENTS

| CN | 1190282 | 8/1998 |
| DE | 19546145 | 6/1996 |

(Continued)

OTHER PUBLICATIONS

U.S. Appl. No. 13/599,234.

(Continued)

*Primary Examiner* — Erick Glass
(74) *Attorney, Agent, or Firm* — Daly, Crowley, Mofford & Durkee, LLP

(57) ABSTRACT

A driver circuit is provided for driving a load, such as a multi-phase motor. The driver circuit includes a gate driver for providing a control signal to switching elements coupled to the driver circuit. A first switching element is coupled between a high supply voltage and a switching node of the load, and a second switching element is coupled between the switching node and a low supply voltage. To detect zero crossings of a current through the load, a zero crossing detector includes a first counter coupled to the switching node and a second counter coupled to the control signal. The first counter and second counter count in a predetermined direction based on a detected voltage of the switching node and based on a detected voltage of the control signal, respectively. The zero crossing detector generates an output signal based upon the difference between the first and the second counter.

46 Claims, 9 Drawing Sheets

(56) References Cited

U.S. PATENT DOCUMENTS

| | | |
|---|---|---|
| 8,729,841 B2 | 5/2014 | Reynolds et al. |
| 8,917,043 B2 | 12/2014 | Reynolds et al. |
| 8,917,044 B2 | 12/2014 | Reynolds et al. |
| 2006/0055352 A1 | 3/2006 | Mori et al. |
| 2007/0018599 A1 | 1/2007 | Yamamoto et al. |
| 2010/0027705 A1 | 2/2010 | Neubauer et al. |
| 2010/0295490 A1 | 11/2010 | Kuroshima et al. |
| 2012/0293098 A1 | 11/2012 | Rote et al. |
| 2013/0009578 A1 | 1/2013 | Reynolds et al. |

FOREIGN PATENT DOCUMENTS

| | | |
|---|---|---|
| EP | 1965490 | 9/2008 |
| EP | 2280476 | 2/2011 |
| JP | H04193084 | 7/1992 |

OTHER PUBLICATIONS

Search Report and Written Opinion dated May 16, 2017 for PCT Application No. PCT/US2017/013741; 11 pages.

Toshiba CMOS Digital Integrated Circuit, Silicon Monolithic, TB9060FN: "3-Phase Full-Wave Sensorless Controller for Brushless DC Motors"; dated Sep. 11, 2002, downloaded from www.datasheetcatalog.com; 21 pages.

Notice of Allowance dated Aug. 26, 2014; for U.S. Appl. No. 13/599,234; 16 pages.

Search Report and Written Opinion dated Feb. 11, 2015 for PCT Application No. PCT/US2013/054639; 10 pages.

International Preliminary Report on patentability dated Mar. 12, 2015 for PCT Application No. PCT/US2013/054639; 7 pages.

Chinese Office Action with English translation dated Nov. 2, 2016 for Chinese Application No. 201380056237.5; 22 pages.

Response to Chinese Office Action with English claims filed on Mar. 14, 2017 for Chinese Application No. 201380056237.5; 106 pages.

500

MOTOR CONTROL CURRENT ZERO CROSSING DETECTOR

CROSS-REFERENCE TO RELATED APPLICATIONS

None.

STATEMENT REGARDING FEDERALLY SPONSORED RESEARCH OR DEVELOPMENT

None.

BACKGROUND

Detecting when alternating current (AC) voltage and/or current waveforms cross through a zero current (or voltage) axis (e.g., "zero crossing") is frequently performed, for example in electric motor control, lamp dimming, powerline communication and other applications. In motor control systems, a half-bridge circuit is frequently used to drive a switching node coupled to a load (e.g., the motor). There is difficulty in robustly detecting the zero-crossing when the switching node is noisy.

Switching node noise is a particular issue when MOSFETs are employed as power switches (e.g., in the half-bridge circuit) for a motor control. Motors tend to present an inductive load to the half-bridge circuit, and the combination of the inductive load with the capacitance of the MOSFETs can cause ringing on the switching node, making accurate detection of the zero crossing difficult.

Further, some systems monitor the current (or voltage) directly and, thus, the signal of interest is low in amplitude since the current (or voltage) is nearing zero at the detection point. Rather than directly sensing the current (or voltage), some systems monitor voltage (or current) of the switching node during "dead time" of the half-bridge circuit. Dead time is a period of time during which all the MOSFETs of the half-bridge circuit are turned off to prevent potentially damaging short circuit (or "shoot through") conditions. However, such systems are required to sense relatively small voltages (currents), thus placing a strict requirement on the tolerances and accuracy of the components employed.

Therefore, an improved zero crossing detector is envisioned to more reliably and accurately detect zero crossings of a current (or voltage) waveform of interest.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a driver circuit for driving a load, such as a multi-phase motor. The driver circuit includes a gate driver for providing a control signal to switching elements coupled to the driver circuit. A first switching element is coupled between a high supply voltage and a switching node of the load, and a second switching element is coupled between the switching node and a low supply voltage. To detect zero crossings of a signal of the switching elements and the load, a zero crossing detector includes a first counter coupled to the switching node and a second counter coupled to the control signal. The first counter and second counter count in a predetermined direction based on a detected voltage of the switching node and based on a detected voltage of the control signal, respectively. The zero crossing detector generates an output signal based upon the difference between the first and the second counter.

In an embodiment, the driver circuit is implemented in a motor controller, and the load is a multi-phase motor. In an embodiment, the zero crossing detector is coupled to a switching node of a first phase of the multi-phase motor. In an embodiment, the driver circuit includes a plurality of zero crossing detectors, each zero crossing detector coupled to a switching node of an associated phase of the multi-phase motor.

In an embodiment, the one or more switching elements are configured in a plurality of half-bridge circuit branches, each branch associated with a given phase of the multi-phase motor. Each half-bridge branch includes a first switching element coupled between a high supply voltage and a switching node of the given phase, and a second switching element coupled between the switching node and a low supply voltage.

In an embodiment, the driver circuit includes a control signal generator to control a speed and a position of the multi-phase motor, based, at least in part, upon the zero crossing output signal. In an embodiment, the control signal generator drives the multi-phase motor in a phase advance mode to reduce a back electromotive force of the motor and align a phase of the current through the load and a phase of a voltage applied to the load. In an embodiment, the control signal generator determines, based at least in part upon the zero crossing output signal, a direction of motion of the multi-phase motor.

In an embodiment, the output comparator is configured to receive an adjustable threshold value, the adjustable threshold value to set a number of counts of at least one of the first counter and the second counter that occur before generating the zero crossing output signal.

In an embodiment, during a dead time when the one or more switching elements are off, the first counter receives a signal indicative of the voltage of the switching node. In an embodiment, an input comparator is coupled to the switching node and a threshold voltage, and generates the signal indicative of the voltage of the switching node.

In an embodiment, the difference between the count value of the first counter and the count value of the second counter corresponds to a direction of motion of the multi-phase motor.

In an embodiment, the one or more switching elements are field effect transistors. In an embodiment, the driver circuit is implemented in an integrated circuit. In an embodiment, the one or more switching elements are internal to the integrated circuit. In another embodiment, the one or more switching elements are external to the integrated circuit.

In an embodiment, the zero crossing detector is configured to detect a zero crossing of a current through the one or more switching elements and the load.

In another aspect, an electronic circuit is provided for controlling operation of a multi-phase motor having a plurality of windings. The electronic circuit includes a gate driver for each phase of the multi-phase motor, which provides a control signal to an associated half-bridge circuit branch. Each half-bridge circuit branch includes a first switching element coupled between a high supply voltage and a switching node of the given phase, and a second switching element coupled between the switching node and a low supply voltage. A zero crossing detector detects a zero crossing of a current through the at least one winding of the multi-phase motor. The zero crossing detector includes a first counter coupled to the switching node and a second counter coupled to one of the control signals. The first counter counts in a predetermined direction based on a detected voltage of the switching node, and the second counter counts in a predetermined direction based on a detected voltage of the control signal. The zero crossing detector generates a difference between a count value of the first counter and a count value of the second counter. The zero crossing detector generates a zero crossing output signal based, at least in part, upon the difference.

In an embodiment, the electronic circuit includes a plurality of zero crossing detectors, each zero crossing detector associated with a given phase of the multi-phase motor.

In an embodiment, the electronic circuit includes a control signal generator to control a speed and a position of the multi-phase motor, based, at least in part, upon the zero crossing output signal. In an embodiment, the control signal generator drives the multi-phase motor in a phase advance mode to reduce a back electromotive force of the motor and align a phase of the current through the load and a phase of a voltage applied to the load. In an embodiment, the control signal generator determines, based at least in part upon the zero crossing output signal, a direction of motion of the multi-phase motor.

In an embodiment, the output comparator receives an adjustable threshold value, the adjustable threshold value to set a number of counts of at least one of the first counter and the second counter that occur before generating the zero crossing output signal.

In an embodiment, during a dead time when the one or more switching elements are off, the first counter receives a signal indicative of the voltage of the switching node. In an embodiment, the electronic circuit includes an input comparator coupled to the switching node and a threshold voltage to generate the signal indicative of the voltage of the switching node.

In an embodiment, the electronic circuit includes the difference between the count value of the first counter and the count value of the second counter corresponds to a direction of motion of the multi-phase motor.

In an embodiment, the one or more switching elements are field effect transistors. In an embodiment, the driver circuit is implemented in an integrated circuit. In an embodiment, the one or more switching elements are internal to the integrated circuit. In another embodiment, the one or more switching elements are external to the integrated circuit.

In another aspect, a method for driving a coupled load by a driver circuit is provided. The method includes providing an associated control signal by a gate driver to each of one or more switching elements coupled to the driver circuit. A first one of the switching elements is coupled between a high supply voltage and a switching node of the load, and a second one of the switching elements is coupled between the switching node and a low supply voltage. A zero crossing detector detects a zero crossing of a signal of the one or more switching elements and the load by: counting, by a first counter coupled to the switching node, in a predetermined direction based on a detected voltage of the switching node, and counting, by a second counter coupled to one of the control signals, in a predetermined direction based on a detected voltage of the control signal. An output comparator coupled to the first counter and the second counter generates a difference between a count value of the first counter and a count value of the second counter. A zero crossing output signal is generated based, at least in part, upon the difference.

In an embodiment, the driver circuit is implemented in a motor controller, and the load comprises a multi-phase motor. In an embodiment, the zero crossing detector is coupled to a switching node of a first phase of the multi-phase motor. In an embodiment, the driver circuit includes a plurality of zero crossing detectors, each zero crossing detector coupled to a switching node of an associated phase of the multi-phase motor. In an embodiment, the one or more switching elements are configured in a plurality of half-bridge circuit branches, each branch associated with a given phase of the multi-phase motor. Each half-bridge circuit branch includes a first switching element coupled between a high supply voltage and a switching node of the given phase, and a second switching element coupled between the switching node and a low supply voltage.

In an embodiment, the method includes controlling a speed and a position of the multi-phase motor based, at least in part, upon the zero crossing output signal. In an embodiment, the method includes driving the multi-phase motor in a phase advance mode to reduce a back electromotive force of the motor and align a phase of the current through the load and a phase of a voltage applied to the load. In an embodiment, the method includes determining, based at least in part upon the zero crossing output signal, a direction of motion of the multi-phase motor.

In an embodiment, the method includes receiving, by the output comparator, an adjustable threshold value and setting, based upon the adjustable threshold value, a number of counts of at least one of the first counter and the second counter that occur before generating the zero crossing output signal.

In an embodiment, the method includes during a dead time when the one or more switching elements are off, receiving, by the first counter, a signal indicative of the voltage of the switching node. In an embodiment, the method includes generating the signal indicative of the voltage of the switching node by an input comparator coupled to the switching node and a threshold voltage.

In an embodiment, the difference between the count value of the first counter and the count value of the second counter corresponds to a direction of motion of the multi-phase motor.

In an embodiment, the one or more switching elements are field effect transistors. In an embodiment, the driver circuit is implemented in an integrated circuit. In an embodiment, the one or more switching elements are internal to the integrated circuit. In another embodiment, the one or more switching elements are external to the integrated circuit.

In an embodiment, the zero crossing detector detects a zero crossing of a current through the one or more switching elements and the load.

In another aspect, a method of detecting a zero crossing of a current through the at least one winding of a multi-phase motor having a plurality of windings is provided. The method includes providing a control signal by a gate driver of a motor controller coupled to the multi-phase motor to an associated half-bridge circuit branch. The half-bridge circuit branch includes a first switching element coupled between a high supply voltage and a switching node, and a second switching element coupled between the switching node and a low supply voltage. A first counter coupled to the switching node counts in a predetermined direction based on a detected voltage of the switching node, and a second counter coupled to the control signal counts in a predetermined direction based on a detected voltage of the control signal. A difference between a count value of the first counter and a count value of the second counter is generated. A zero crossing output signal is generated based, at least in part, upon the difference.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure might be repeated in one or more subsequent figures without additional description in the specification in order to provide context for other features.

Figure 1:
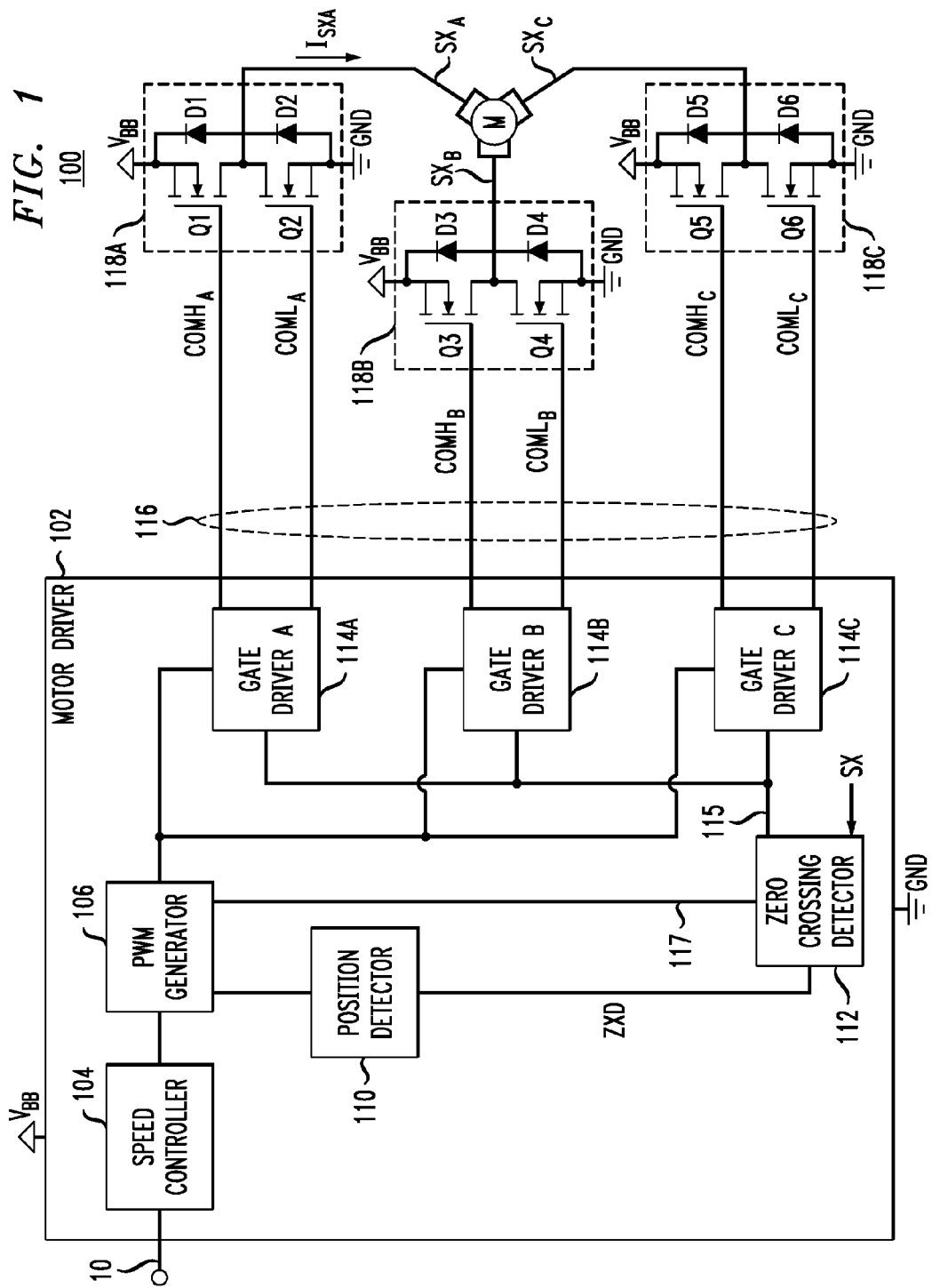
FIG. 1 is a schematic diagram showing a motor driver with a zero crossing detector in accordance with illustrative embodiments.
Figure 2:
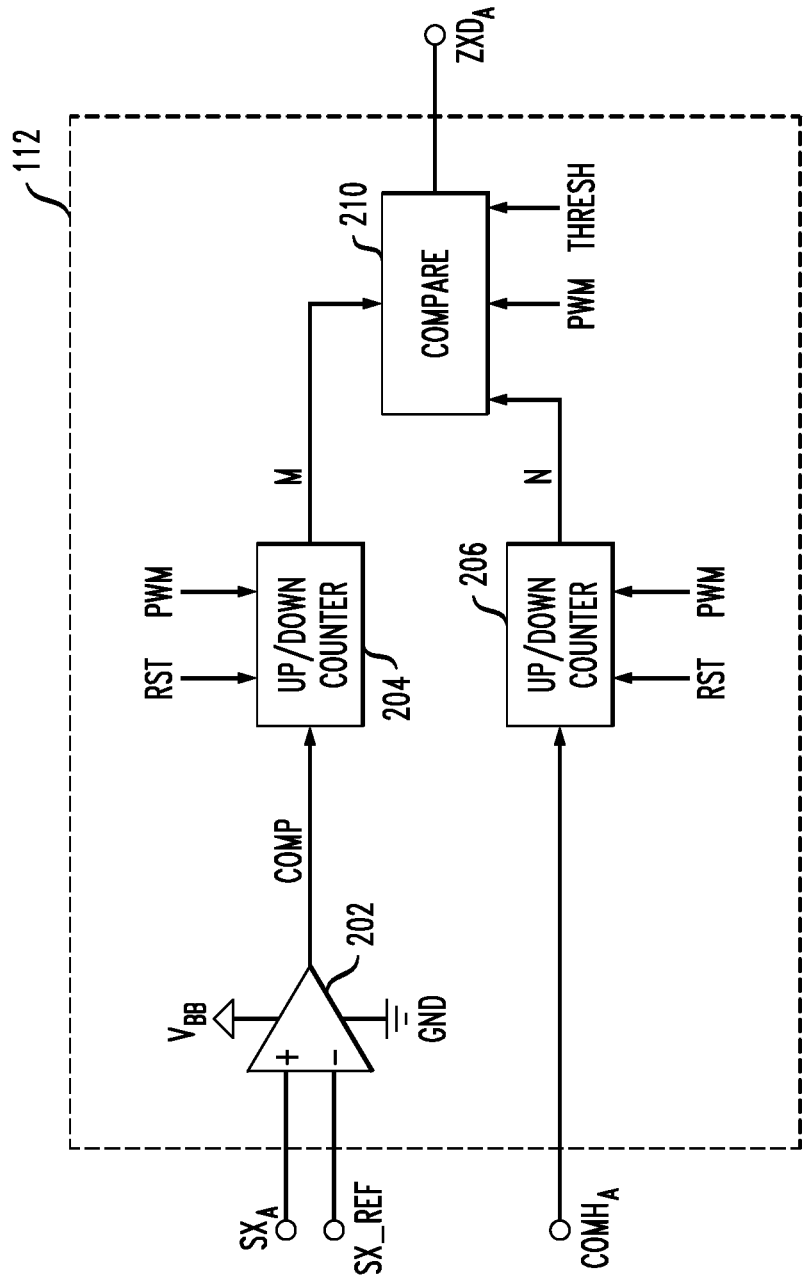
FIG. 2 is a block diagram of the zero crossing detector of the motor driver of FIG. 1.
Figure 3A:
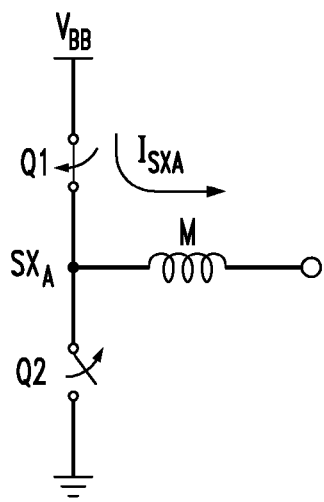
Figure 3B:
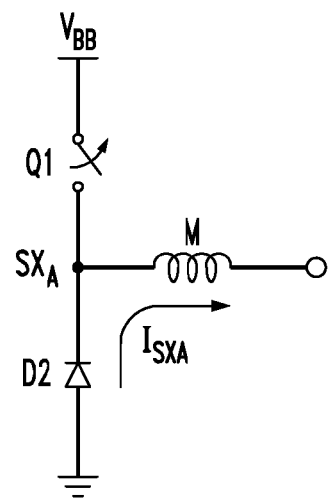
Figure 3C:
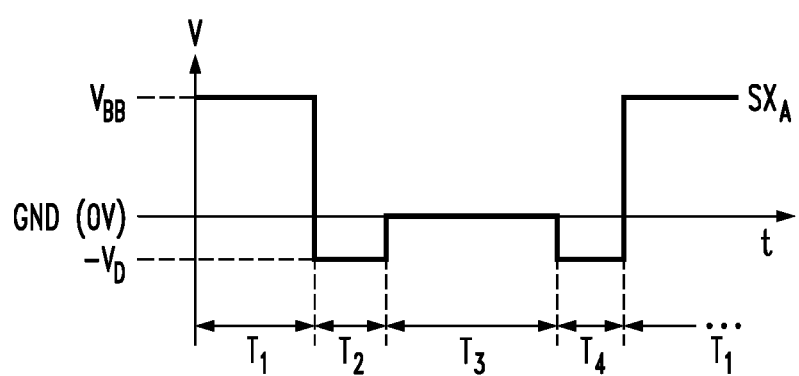
Figure 4A:
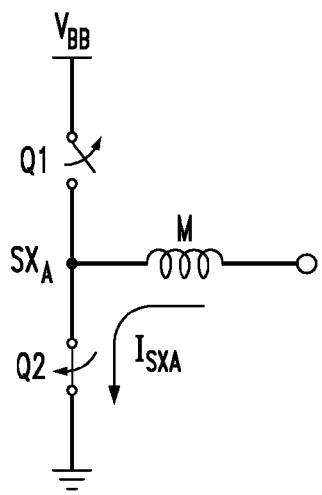
Figure 4B:
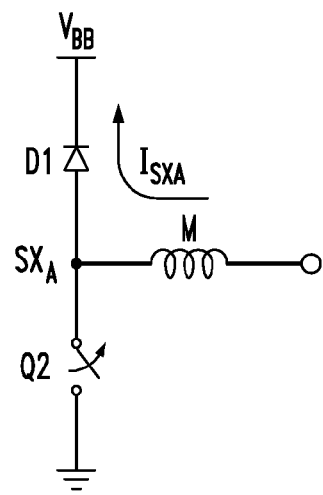
Figure 4C:
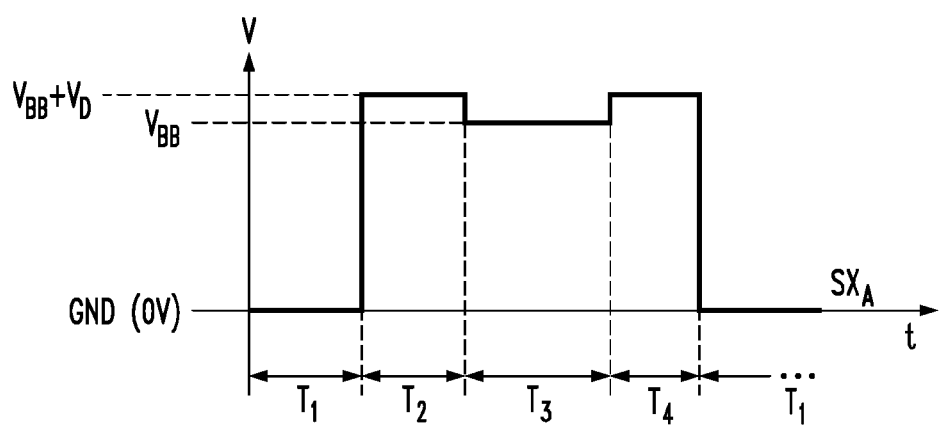
Figure 5:
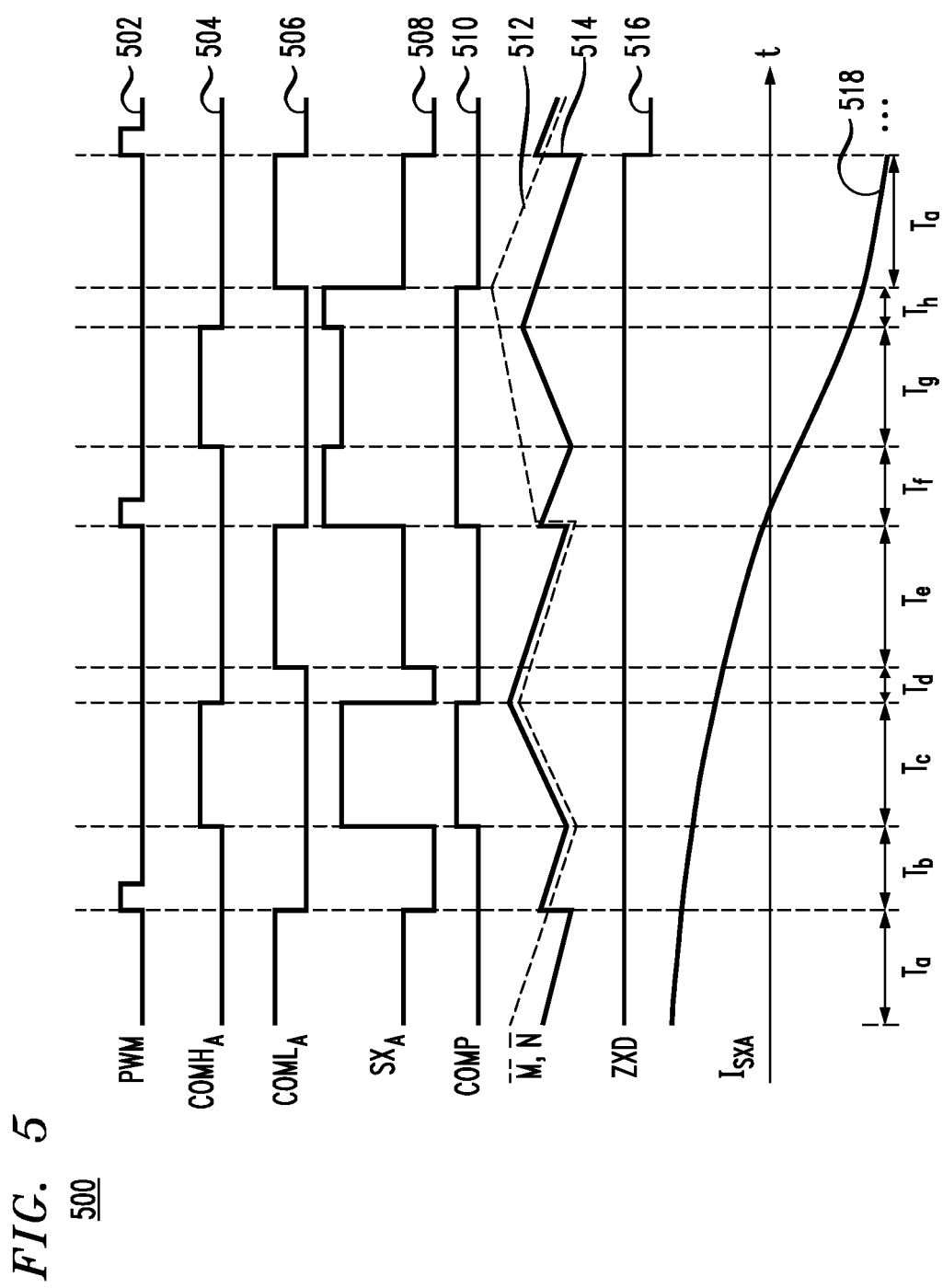
Figure 6:
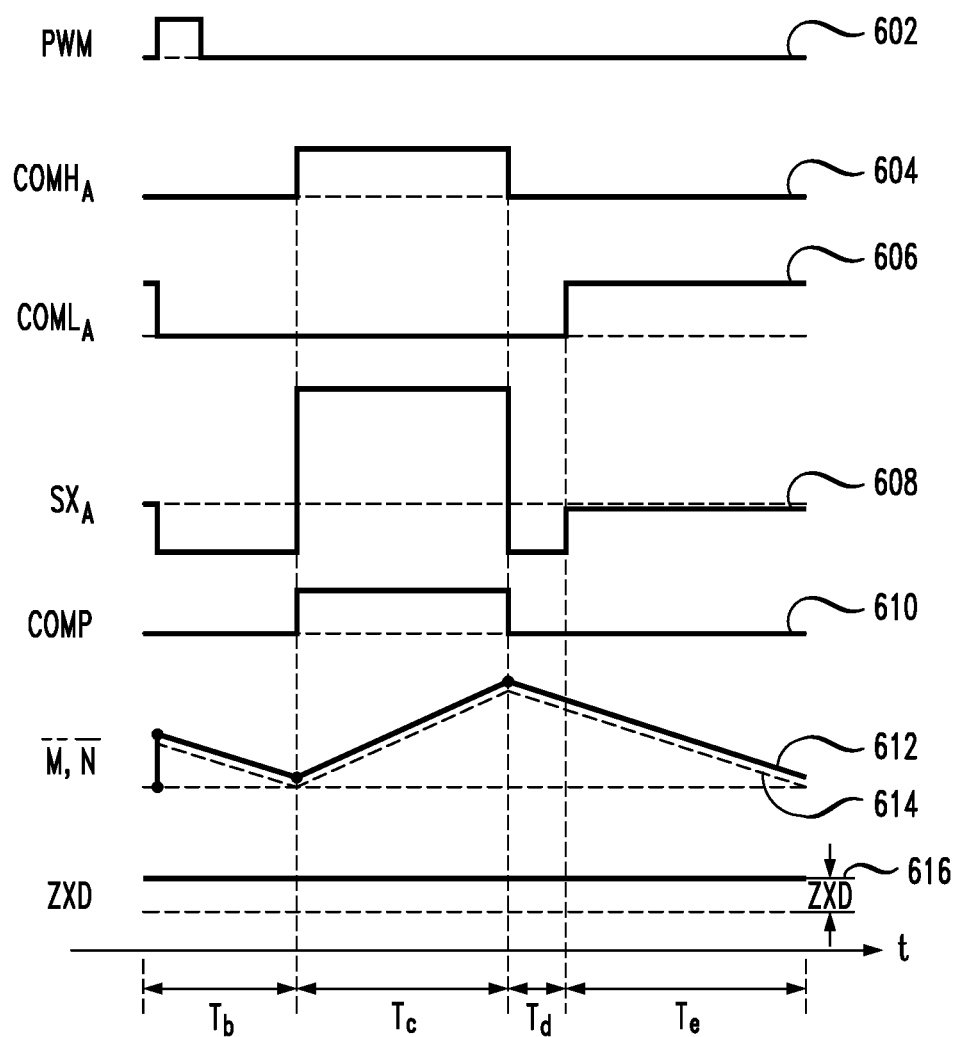
Figure 7:
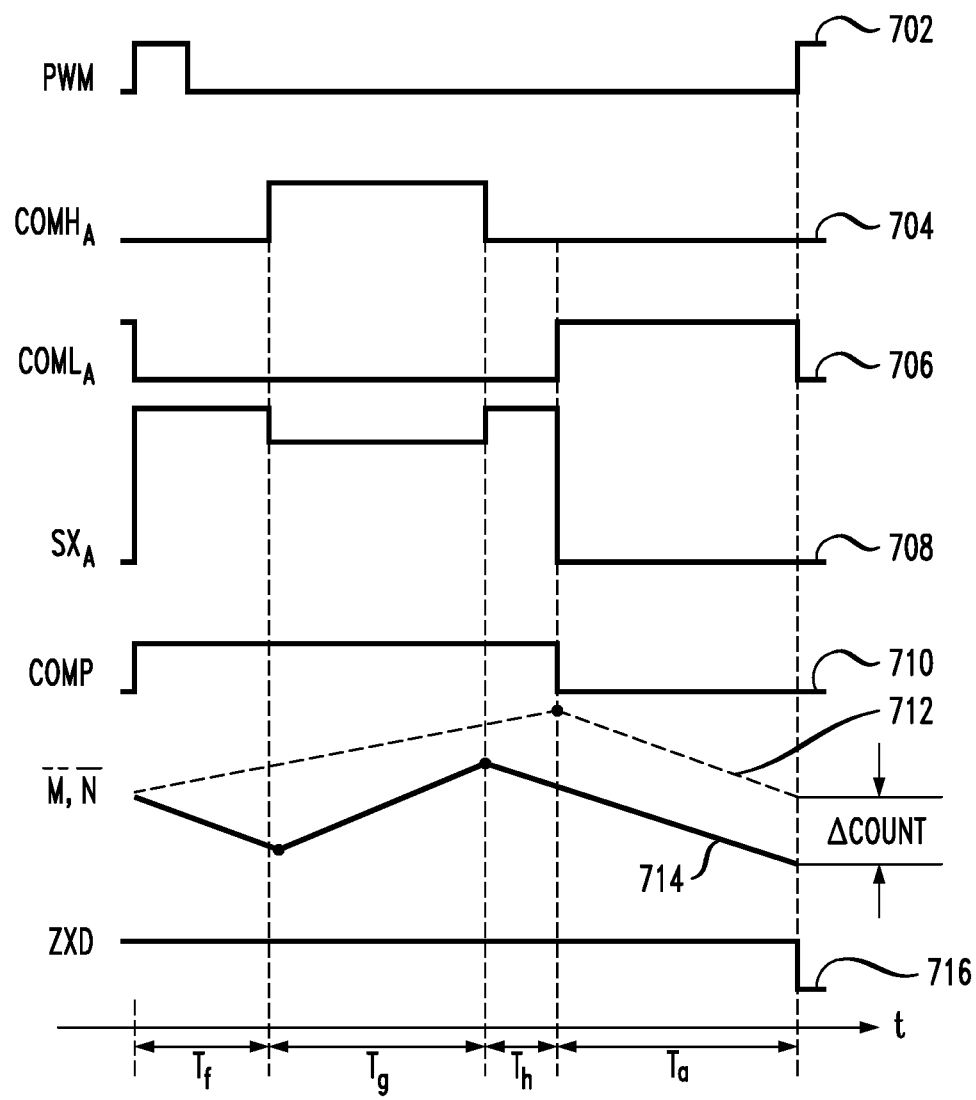
Figure 8:
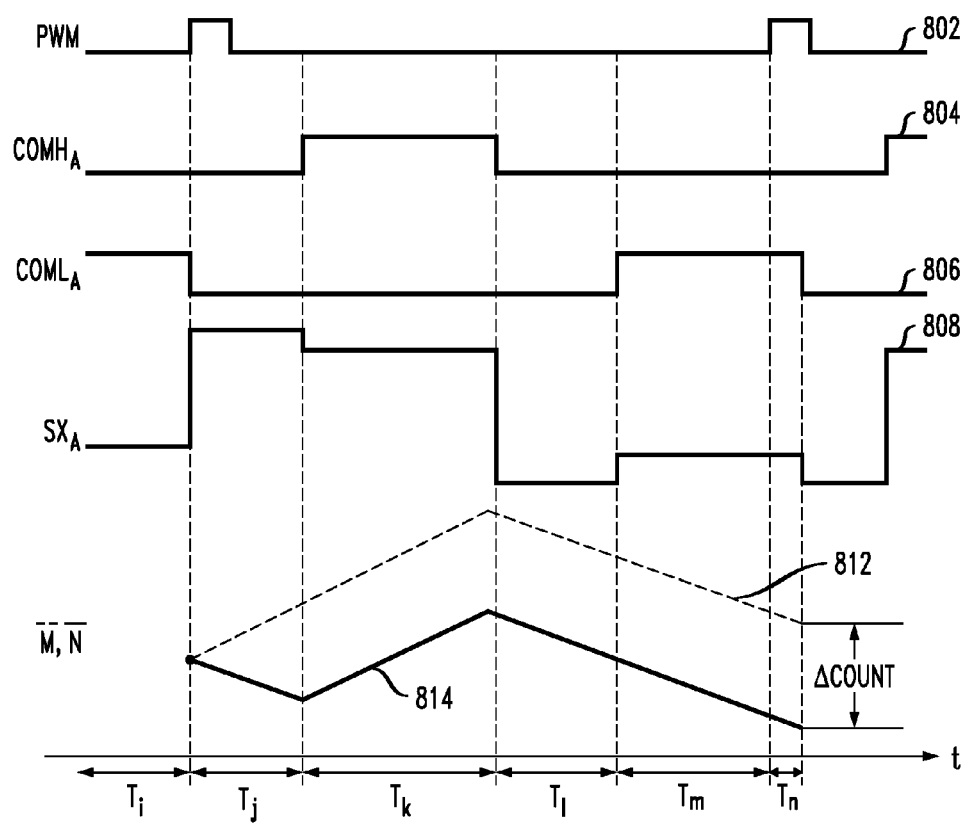
Figure 9:
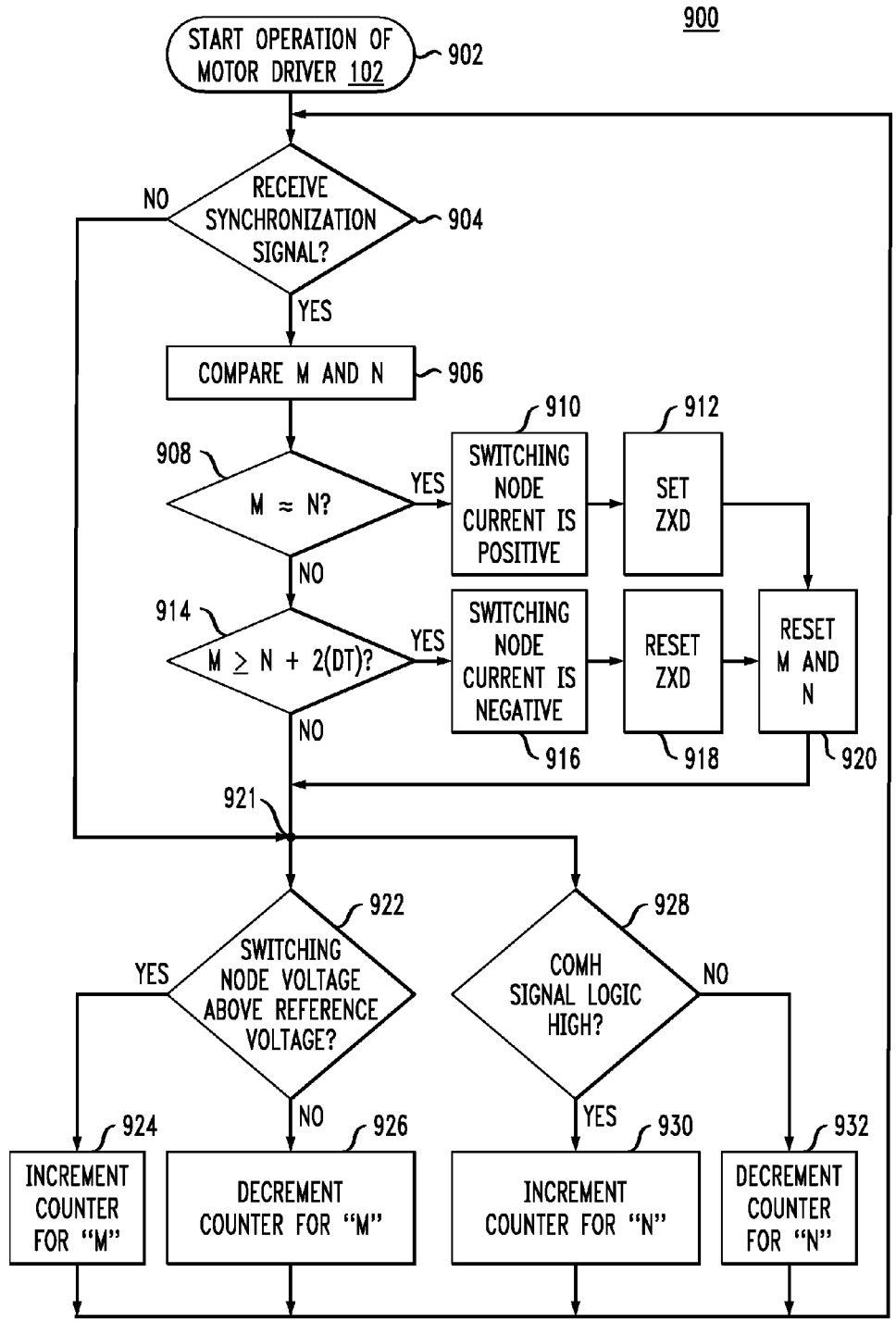

FIGS. 3A and B are schematic diagrams showing illustrative operating conditions of the motor driver of FIG. 1 and FIG. 3C is a timing diagram showing a voltage of a switching node of the motor driver of FIG. 1 when the motor driver is sourcing current to the motor;

FIGS. 4A and B are schematic diagrams showing illustrative operating conditions of the motor driver of FIG. 1 and FIG. 4C is a timing diagram showing a voltage of a switching node of the motor driver of FIG. 1 when the motor driver is sinking current from the motor;

FIG. 5 is a timing diagram showing illustrative signals of the zero crossing detector of FIG. 2;

FIG. 6 is a timing diagram showing signals of the zero crossing detector of FIG. 2 when the motor driver is sourcing current to the motor;

FIG. 7 is a timing diagram showing signals of the zero crossing detector of FIG. 2 when the motor driver is sinking current from the motor;

FIG. 8 is a timing diagram showing signals of the zero crossing detector of FIG. 2 when the motor driver transitions between sourcing current to the motor and sinking current from the motor; and FIG. 9 is a flow diagram showing an illustrative operating technique of the zero crossing detector of FIG. 2.

DETAILED DESCRIPTION

Described embodiments provide a motor driver with a zero crossing detector to detect when alternating current (AC) through a motor winding passes through zero (e.g., switches between a positive half-cycle and a negative half-cycle of the AC current). Typical motor drivers control a plurality of transistors arranged in one or more half-bridge control circuits to control current through the motor windings. As will be described in greater detail, embodiments of the zero crossing detector can employ standard comparators since described embodiments do not detect small voltage differences (e.g., a single diode voltage drop) versus a large supply voltage, which would place strict requirements on the tolerances and accuracy of the components employed. Further, described embodiments do not monitor the current (or voltage) directly where the signal of interest is low in amplitude since the current (or voltage) is nearing zero at the detection point. Finally, described embodiments compare two counters after an entire pulse-width modulation (PWM) control period of the half-bridge circuits, thus making the zero crossing detection more robust by averaging out errors over time.

Referring to FIG. 1, a schematic of illustrative motor system 100 is shown. Motor system 100 includes motor driver 102 to control operation of multi-phase motor M. Although shown in FIG. 1 as being a three-phase motor, in some embodiments, motor M could employ other numbers of phases, as would be understood by one of ordinary skill in the art.

When motor M is a three-phase motor, the motor includes three windings (not shown), each of which, as would be understood by one of skill in the art, can be depicted as an equivalent circuit having an inductor in series with a resistor and in series with a back electromotive force (EMF) voltage source. The voltage of the back EMF voltage source is directly observable when the current through the associated motor winding is zero. Thus, zero crossing information might beneficially be employed to determine back EMF and, therefore, also a direction of motion of motor M (for example to determine windmilling and/or reverse motion).

Motor driver 102 includes speed controller 104 coupled to receive speed demand signal 10 from an external device coupled to motor driver 102. In general, external speed demand signal 10 is indicative of a requested speed of motor M. External speed demand signal 10 can be provided in one of a variety of formats, for example, a Single Edge Nibble Transmission (SENT) format, a Serial Peripheral Interface (SPI) format, a Local Interconnect Network (LIN) format, a CAN (Controller Area Network) format, an Inter-Integrated Circuit (I2C) format, or other similar signal formats.

Speed controller 104 provides a speed demand signal to pulse width modulation (PWM) generator 106, which generates PWM signals to control a gate driver corresponding to each phase of motor M. As shown in FIG. 1, there is one gate driver (e.g., 114A, 114B and 114C) for each phase of motor M. A maximum duty cycle of the PWM signals is controlled by the speed demand signal. In some embodiments, PWM generator 106 generates the PWM signals with a modulation characteristic (i.e., a relative time-varying duty cycle).

Gate driver circuits 114A, 114B and 114C receive the PWM signals from PWM generator 106 and generate transistor drive signals $COMH_A$, $COML_A$, $COMH_B$, $COML_B$, $COMH_C$ and $COML_C$ (collectively, transistor drive signals 116) to drive corresponding half-bridge circuits 118A, 118B and 118C, each corresponding to a given phase of motor M.

As shown in FIG. 1, half-bridge circuit 118A includes transistors Q1 and Q2, half-bridge circuit 118B includes transistors Q3 and Q4, and half-bridge circuit 118C includes transistors Q5 and Q6. Each of transistors Q1, Q2, Q3, Q4, Q5 and Q6 is shown as being an N-channel metal oxide semiconductor field effect transistor (MOSFET) and, thus, each transistor has a corresponding intrinsic body diode, shown as diodes D1, D2, D3, D4, D5 and D6, respectively. Each body diode is arranged from drain (cathode) to source (anode) of the MOSFET, making the MOSFET able to block current in only one direction. The body diodes are thus frequently utilized as freewheeling diodes for inductive loads, such as motor M, for example when the MOSFET is used as a switch in a half-bridge circuit.

The six transistors Q1, Q2, Q3, Q4, Q5 and Q6 are synchronized to operate in saturation to provide three motor drive signals $SX_A$, $SX_B$ and $SX_C$, respectively, to motor M. In some embodiments, transistors Q1, Q2, Q3, Q4, Q5 and Q6 are internal to motor driver 102. In other embodiments, transistors Q1, Q2, Q3, Q4, Q5 and Q6 are external devices coupled to motor driver 102. Although shown in FIG. 1 as being N-channel MOSFETs, other types of switching elements might be employed, for example P-channel MOSFETs, bipolar junction transistors (BJTs), Silicon-Controlled Rectifiers (SCRs), thyristors, triacs, or other similar switching elements.

Motor driver 102 can also include a position detector 110 to generate a position reference signal indicative of a rotational reference position of motor M. In some embodiments, position detector 110 is coupled to zero crossing detector 112. Zero crossing detector 112 is coupled to receive at least one of the transistor drive signals 116 (e.g., at least one of the COMH and COML signals from one or more gate driver circuits 114A, 114B and 114C, as indicated by connection 115). Zero crossing detector 112 is also coupled to receive at least one of the motor drive signals SX (e.g., at least one of $SX_A$, $SX_B$ and $SX_C$, as indicated by connection SX). Zero crossing detector 112 generates at least one zero crossing signal ZXD indicative of a zero crossing of the current through one or more of the windings of motor M. For example, zero crossing signal $ZXD_A$ corresponds to motor drive signal $SX_A$. The zero crossing signal can be used by position detector 110 to estimate a position and/or back EMF of motor M. In some embodiments, one or more Hall effect elements or other magnetic field sensing elements (not shown) might be coupled to position detector 110 to provide Hall signals based upon the rotational position of motor M.

PWM generator 106 is coupled to receive a position reference signal from position detector 110. PWM generator 106 is also coupled to zero crossing detector 112 to provide a PWM timing signal and to receive the zero crossing signal ZXD from zero crossing detector 112, as indicated by connection 117. In some embodiments, PWM generator 106 can modify the PWM signals to gate driver circuits 114A, 114B and 114C in accordance with a phase difference between the position reference signal and the zero crossing signal. Thus, in some embodiments, motor driver 102 can automatically adjust a timing (i.e., a phase) of the transistor drive signals 116 by modifying the PWM signals to gate driver circuits 114A, 114B and 114C. Thus, motor driver 102 can adjust the motor drive signals $SX_A$, $SX_B$ and $SX_C$ in relation to a sensed rotational position of motor M.

For example, PWM generator 106 might control the speed, position and direction of motor M based upon the zero crossing output signal ZXD. Some embodiments of motor driver 102 might also provide for driving motor M in a phase advance mode to reduce a back electromotive force of the motor and align a phase of the current through motor M and a phase of a voltage applied to motor M (e.g., align a phase of the motor drive signal SX current and a phase of the motor drive signal SX voltage).

Motor driver 102 receives a power supply voltage VBB, which is also supplied to the motor through transistors Q1, Q3 and Q5 during times when transistors Q1, Q3 and Q5 are turned on. Motor driver 102 also receives a ground (or circuit common) supply voltage GND, which is also supplied to the motor through transistors Q2, Q4 and Q6 during times when transistors Q2, Q4 and Q6 are turned on. It will be understood that there can be a small voltage drop (for example, 0.1 volts) through transistors Q1, Q2, Q3, Q4, Q5 and Q6 when they are turned on and supplying current to motor M.

To prevent short circuit (or "shoot through") conditions, only one transistor in each of half-bridge circuits 118A, 118B and 118C can be turned on at a given time. As a precaution, gate driver circuits 114A, 114B and 114C might control transistor drive signals 116 such that for short periods of time after one of the transistors of a given half-bridge circuit 118 turns off, the other transistor cannot turn on and, thus, both transistors are off. This time is commonly known as "dead time" of the half-bridge circuit. For the illustrative system shown in FIG. 1, during dead time for each half-bridge circuit 118, the upper transistor (e.g., transistors Q1, Q3 and Q5) and the lower transistor (e.g., transistors Q2, Q4 and Q6) are both off (e.g., transistor drive signals COMH and COML are both low).

Current is provided to motor M by turning on an upper transistor (e.g., one of transistors Q1, Q3 and Q5) in a given half-bridge circuit 118 to couple supply voltage VBB though the upper transistor to motor M, and turning on a lower transistor (e.g., transistors Q2, Q4 and Q6) in another half-bridge circuit 118 to couple ground voltage GND though the lower transistor to motor M, allowing current to flow through a corresponding winding of motor M. For example, if upper transistor Q1 is turned on (e.g., $COMH_A$ is logic high), then one of lower transistors Q4 and Q6 could be turned on (e.g., one of $COML_B$ or $COML_C$ is logic high) to allow a current to flow through an associated winding of motor M.

Referring to FIG. 2, a block diagram of an illustrative embodiment of zero crossing detector 112 is shown. For simplicity, FIG. 2 shows zero crossing detector 112 as receiving the $SX_A$ motor drive signal and the $COMH_A$ transistor drive signal, thereby monitoring the current through motor M with respect to half-bridge 118A. In other embodiments, zero crossing detector 112 might receive the $SX_B$ or $SX_C$ motor drive signals and the $COMH_B$ or $COMH_C$ transistor drive signals, thereby monitoring the current through motor M with respect to half-bridge 118B or 118C, respectively. Yet other embodiments of zero crossing detector 112 might receive all, or a sub-combination, of the $SX_A$, $SX_B$ or $SX_C$ motor drive signals and the associated $COMH_A$, $COMH_B$ or $COMH_C$ transistor drive signals. In some embodiments, the corresponding COML transistor drive signal could be employed either additionally or alternatively to the corresponding COMH transistor drive signal.

As shown in FIG. 2, zero crossing detector 112 includes comparator 202 which compares the $SX_A$ motor drive signal to a reference, shown as SX_REF. Comparator 202 also receives a power supply of VBB and GND. In some embodiments, the output of comparator 202, shown as COMP, is a digital signal having a logic high value when $SX_A$ is greater than SX_REF, and having a logic low value when $SX_A$ is less than SX_REF. In an illustrative embodiment, SX_REF is equal to half of the supply voltage $V_{BB}$, although other values of SX_REF might be employed.

The COMP signal is provided to up/down counter 204. Up/down counter 204 counts up or down, based upon the value of the COMP signal, when a timing signal, PWM, is received. For example, if the COMP signal has a logic low value when the PWM signal is received, up/down counter 204 decrements its current value. Similarly, if the COMP signal has a logic high value when the PWM signal is received, up/down counter 204 increments its current value. In some embodiments, the PWM signal might be generated by PWM generator 106 based upon a desired duty cycle of gate drivers 114 (e.g., connection 117 of FIG. 1). The current value of up/down counter 204 is output as signal M and provided to comparator 210. Up/down counter 204 also receives a reset signal, RST, that can reset the current value of the counter to zero (or a predetermined default value).

Zero crossing detector 112 also includes up/down counter 206, which receives the $COMH_A$ transistor drive signal. Up/down counter 206 counts up or down, based upon the value of the $COMH_A$ transistor drive signal, when the timing signal, PWM, is received. For example, if the $COMH_A$ transistor drive signal has a logic low value when the PWM signal is received, up/down counter 206 decrements its current value. Similarly, if the $COMH_A$ transistor drive signal has a logic high value when the PWM signal is received, up/down counter 206 increments its current value. The current value of up/down counter 206 is output as signal N and provided to comparator 210. Up/down counter 206 also receives a reset signal, RST, that can reset the current value of the counter to zero (or a predetermined default value).

Comparator 210 receives the M and N signals from up/down counter 204 and up/down counter 206, respectively, and compares the M and N values when the timing signal, PWM, is received. The comparison between M and N is based upon a threshold signal, shown as THRESH. The output of comparator 210 is provided as the zero crossing output signal, ZXDA, from zero crossing detector 112.

Thus, as shown in FIG. 2, comparator 202 compares $SX_A$ to SX_REF (which might be equal to $SX_A/2$ in some embodiments). Therefore, comparator 202 does not need to be a high accuracy comparator, since comparator 202 is detecting voltage differences generally much larger than a diode drop, as will be explained in greater detail below. As described, since comparator 210 compares the values of up/down counters 204 and 206 over an entire period of the PWM signal, the zero crossing output signal ZXD can average out estimation errors over time. In some embodiments, one or more of up/down counters 204 and 206, comparator 202 and comparator 210 might be implemented in a microprocessor. In other embodiments, one or more of up/down counters 204 and 206, comparator 202 and comparator 210 might be implemented as one or more discrete components.

Further, the threshold signal, THRESH, allows guardbanding of the zero current detection threshold, for example to account for switching delays of transistors Q1-Q6 and the delay of comparator 202. Depending on the setting, the difference between M and N (e.g., the number of counts) required to detect a zero crossing threshold can be adjusted, for example by a user of motor driver 102 (e.g., as a register setting or adjustable signal value, etc.). In illustrative embodiments, THRESH will be equal to a number of counts representative of a time duration value between zero and the duration of a dead time. Thus, the count difference which indicates a current zero crossing event can thus be adjusted by a programmable amount, dictated by the THRESH.

Referring to FIGS. 3 and 4, illustrative operating conditions are shown for half-bridge circuit 118A. For example, FIGS. 3A and 3B show an equivalent circuit representation of transistors Q1, Q2 (and corresponding body diodes D1 and D2) and a winding of motor M, with current flow I through the winding of motor M, when half-bridge circuit 118A is providing current to motor M. FIG. 3C shows an illustrative waveform of the voltage of motor drive signal $SX_A$ over time, t. Similarly, FIGS. 4A and 4B show an equivalent circuit representation of transistors Q1, Q2 (and corresponding body diodes D1 and D2) and a winding of motor M, with current flow I through the winding of motor M, when half-bridge circuit 118A is sinking current from motor M. FIG. 4C shows an illustrative waveform of the voltage of motor drive signal $SX_A$ over time, t.

Referring to FIGS. 3A and B, transistors Q1 and Q2 of half-bridge circuit 118A can be modeled as switches (since they are operating in saturation), and a winding of motor M can be modelled as an inductor. When transistor Q1 is on (e.g., the switch is closed), transistor Q2 is off (e.g., the switch is open), and current is sourced from power supply voltage VBB to motor M. Although not shown in FIGS. 3A and B for simplicity, as previously described, a lower transistor of one of half-bridge circuits 118B and 118C (e.g., one of transistors Q4 or Q6) is also turned on to complete the circuit from VBB, through a corresponding winding of motor M, to GND.

If the motor current, I, is flowing from half-bridge circuit 118A to motor M when transistor Q1 is on (see FIG. 3A), when transistor Q1 turns off (e.g., the switch is opened), then the current, I, must continue to flow in the same direction since motor M is an inductive load and current in an inductor cannot change instantaneously. Thus, during dead time when both transistors Q1 and Q2 are off (see FIG. 3B), current $I_{SXA}$ flows through the body diode, D2, of transistor Q2, and the voltage of $SX_A$ goes one diode voltage drop below GND (e.g., the voltage to which transistor Q2 is referenced).

FIG. 3C shows a timing diagram of the voltage of motor drive signal $SX_A$ over time, t. As shown, a given cycle of operation can be divided into time segments $T_1$, $T_2$, $T_3$ and $T_4$ that repeat over the operation of motor driver 102. As shown, during time period T1, transistor Q1 is on and transistor Q2 is off (e.g., as shown in FIG. 3A), and the voltage of motor drive signal $SX_A$ is substantially equal to the supply voltage $V_{BB}$ (e.g., $V_{BB}$ less the forward voltage drop across transistor Q1). When transistor Q1 turns off, transistor Q2 remains off for dead time. However, the current through motor M continues to flow through body diode D2 of transistor Q2 (e.g., as shown in FIG. 3B). Thus, during time period T2 when both transistors Q1 and Q2 are off (e.g., dead time), the voltage of motor drive signal $SX_A$ is equal to GND minus the forward voltage of body diode D2 (shown in FIG. 3C as body diode voltage $V_D$). After dead time, during time period $T_3$, transistor Q2 might turn on, and the voltage of motor drive signal $SX_A$ is substantially equal to GND (e.g., GND plus the forward voltage drop across transistor Q2). Transistor Q2 turns off, and transistor Q1 is also off, for dead time during time period T4, and the voltage of motor drive signal $SX_A$ is equal to GND minus the forward voltage of body diode D2.

Referring to FIGS. 4A and B, when transistor Q1 is off (e.g., the switch is open), transistor Q2 is on (e.g., the switch is closed), and current is sunk from motor M to GND. Although not shown in FIGS. 4A and B for simplicity, as previously described, an upper transistor of one of half-bridge circuits 118B and 118C (e.g., one of transistors Q3 or Q5) is also turned on to complete the circuit from VBB, through a corresponding winding of motor M, to GND through transistor Q2.

If the motor current, I, is flowing from motor M through half-bridge circuit 118A when transistor Q2 is on (see FIG. 4A), when transistor Q2 turns off (e.g., the switch is opened), then the current, I, must continue to flow in the same direction since motor M is an inductive load and current in an inductor cannot change instantaneously. Thus, during dead time when both transistors Q1 and Q2 are off (see FIG. 4B), current $I_{SXA}$ flows through the body diode, D1, of transistor Q1, and the voltage of $SX_A$ goes one diode voltage drop above supply voltage VBB (e.g., the voltage to which transistor Q1 is referenced).

FIG. 4C shows a timing diagram of the voltage of motor drive signal $SX_A$ over time, t. As shown, a given cycle of operation can be divided into time segments $T_1$, $T_2$, $T_3$ and $T_4$ that repeat over the operation of motor driver 102. As shown, during time period T1, transistor Q1 is off and transistor Q2 is on (e.g., as shown in FIG. 4A), and the voltage of motor drive signal $SX_A$ is substantially equal to GND (e.g., GND plus the forward voltage drop across transistor Q2). When transistor Q2 turns off, transistor Q1 remains off for dead time. However, the current through motor M continues to flow through body diode D1 of transistor Q1 (e.g., as shown in FIG. 4B). Thus, during time period $T_2$ when both transistors Q1 and Q2 are off (e.g., dead time), the voltage of motor drive signal $SX_A$ is equal to supply voltage $V_{BB}$ plus the forward voltage of body diode D1 (shown in FIG. 4C as body diode voltage $V_D$). After dead time, during time period $T_3$, transistor Q1 might turn on to source current to a lower transistor of one of half-bridge circuits 118B and 118C (e.g., one of transistors Q4 or Q6), and the voltage of motor drive signal $SX_A$ is substantially equal to $V_{BB}$ (e.g., $V_{BB}$ less the forward voltage drop across transistor Q1). Transistor Q1 turns off, and transistor Q2 is also off, for dead time during time period $T_4$, and the voltage of motor drive signal $SX_A$ is equal to supply voltage $V_{BB}$ plus the forward voltage of body diode D1.

Thus, as can be seen from FIGS. 3 and 4, detecting zero crossings during dead times using the voltage of $SX_A$ can require detection voltages that are very small (e.g., one diode drop or less). Thus, prior art zero crossing detection techniques are not robust, especially considering ringing on the switching node. Further, when the current $I_{SXA}$ is near zero (e.g., near a zero crossing), the forward voltage $V_D$ of the transistor body diodes is small since diode forward voltage is minimal for low currents. Thus, prior art solutions required highly accurate components.

Referring back to FIG. 2, described embodiments of zero crossing detector 112 provide a time-domain zero crossing detection signal and improve the robustness of the zero crossing detection by comparing $SX_A$ to SX_REF rather than trying to detect single diode voltages. As described, SX_REF might be a relatively large voltage (e.g., $V_{BB}/2$). In other embodiments, SX_REF might be a voltage close to $V_{BB}$ with a large hysteresis band. The transistor drive signal (e.g., $COMH_A$), which includes dead time information, is provided to up/down counter 206. If the $COMH_A$ signal is high, up/down counter 206 counts up. If the $COMH_A$ signal is low, up/down counter 206 counts down. In some embodiments, up/down counters 204 and 206 are reset every PWM cycle. Thus at the end of each PWM cycle, the $COMH_A$ counter (e.g., up/down counter 206) will have a specific count value, output as count signal N, that should be approximately an expected value every PWM cycle.

Throughout the PWM cycle, the voltage of $SX_A$ is compared to SX_REF by comparator 202, and the resulting COMP signal is provided to up/down counter 204 to count up if COMP is high (e.g., $SX_A$ is greater than SX_REF) and count down if COMP is low (e.g., $SX_A$ is less than SX_REF). Described embodiments do not need to employ high accuracy components (e.g., comparator 202), since the comparison is made between $SX_A$ and SX_REF. At the end of the PWM cycle, the count value of up/down counter 204 is output as count signal M, and the output of up/down counters 204 and 206 (e.g., count signals M and N, respectively) are compared. As will be described, a difference between count signals M and N indicates zero crossing information.

For example, as described in regard to FIGS. 3 and 4, during dead times, the voltage of $SX_A$ clamps to either one diode voltage above $V_{BB}$ or one diode voltage below GND, which alters the COMP count value that is based on $SX_A$. During dead times, $COMH_A$ is low (e.g., transistor Q1 is off), but the voltage of $SX_A$ will clamp to either the high-side or low-side body diodes of the power FETs, as shown in FIGS. 3C and 4C. Thus the $COMH_A$ counter (e.g., up/down counter 206, which produces count value N) will always count down during dead times, whereas the $SX_A$ counter (e.g., up/down counter 204, which produces count value M) can count either up or down based on the voltage of $SX_A$. Differences between M and N at the end of the PWM cycle indicate the current direction during dead times and, therefore, when current zero crossings occur. As described previously, the $COML_A$ signal could additionally or alternatively be employed by up/down counter 206.

FIGS. 5-8 show illustrative waveforms of system 100 in illustrative operational states. For example, FIG. 5 is a timing diagram showing illustrative signals of zero crossing detector 112. As shown in FIG. 5, waveform 502 shows the periodic PWM signal provided to up/down counters 204 and 206 and comparator 210. Waveforms 504 and 506 show the $COMH_A$ and $COML_A$ signals, respectively, showing whether transistors Q1 and Q2 are on or off. Waveform 508 shows an illustrative voltage of $SX_A$. Waveform 510 shows an illustrative COMP signal output from comparator 202. Waveform 512 (e.g., the dashed line) shows an illustrative count value of M output by up/down counter 204. Waveform 514 (e.g., the solid line) shows an illustrative count value of N output by up/down counter 206. Waveform 516 shows an illustrative zero crossing output signal ZXD output by zero crossing detector 112. Waveform 518 shows an illustrative current sinewave for current $I_{SXA}$, which represents the current through a winding of motor M. As shown for the illustrative operating condition of FIG. 5, operation of zero crossing detector 112 occurs over eight time periods, shown as time periods $T_a$-$T_h$, as will be described in greater detail in regard to FIGS. 6 and 7.

FIG. 6 is a timing diagram showing a closer view of signals of zero crossing detector 112 during time periods $T_b$, $T_c$, $T_d$ and $T_e$ of FIG. 5. During time periods $T_b$, $T_c$, $T_d$ and $T_e$, current is being sourced to motor M (e.g., current $I_{SXA}$ is positive). As described in regard to FIGS. 3 and 4, when current is being sourced to motor M (e.g., through transistor Q1 during time period $T_c$), during dead times (e.g., time periods $T_b$ and $T_d$), the current flows through the low-side body diode (e.g., body diode D2). Thus, as shown by waveforms 612 and 614, the count value of M is substantially equal to the count value of N at the end of the PWM period at the end of time period $T_e$. As shown by waveform 616, the zero crossing output signal ZXD remains logic high since M and N are equal (or nearly equal, for example within a threshold value of each other, as set by the THRESH signal).

FIG. 7 is a timing diagram showing a closer view of signals of zero crossing detector 112 during time periods $T_f$, $T_g$, $T_h$ and $T_a$ of FIG. 5. During time periods $T_f$, $T_g$, $T_h$ and $T_a$, current is being sunk from motor M (e.g., current $I_{SXA}$ is negative). As described in regard to FIGS. 3 and 4, when current is being sunk from motor M (e.g., through transistor Q2 during time period $T_a$), during dead times (e.g., time periods $T_f$ and $T_h$), the current flows through the high-side body diode (e.g., body diode D1). Thus, as shown by waveforms 712 and 714, the count value of M is greater than the count value of N at the end of the PWM period at the end of time period $T_a$, shown as Acount. This causes the maximum difference in the number of counts (proportional to double the dead-time) at the end of the PWM period. As shown by waveform 716, the zero crossing output signal ZXD changes state from logic high to logic low since M is greater than N (for example, M is greater than the expected count value for a PWM cycle plus two dead time periods).

Other embodiments might detect a zero crossing (e.g., change the state of zero crossing output signal ZXD) when M is greater than the expected count value for a PWM cycle plus a single dead time period. For example, FIG. 8 is a timing diagram showing signals of zero crossing detector 112 when current $I_{SXA}$ transitions between being sunk from motor M (e.g., during time periods $T_i$, $T_j$, $T_k$) to being sourced to motor M (e.g., during time periods $T_l$, $T_m$, $T_n$). As shown by waveforms 812 and 814, this produces a count difference, Acount, equal to half of the maximum value (proportional to a single dead-time).

Referring to FIG. 9, a flow diagram of zero crossing detection technique 900 is shown. At block 902, operation of motor driver 102 begins, for example at a power up of system 100. At block 904, if the PWM synchronization signal is received by zero crossing detector 112 (e.g., up/down counters 204 and 206 and comparator 210), processing continues at block 906. If, at block 904, the PWM synchronization signal is not received by zero crossing detector 112, processing continues to node 921 where blocks 922 and 928 are performed in parallel (e.g., blocks 922, 924 and 926 are performed in parallel with blocks 928, 930 and 932).

At block 906, after the PWM signal is received, the count of up/down counter 204 (e.g., count value M) and the count of up/down counter 206 (e.g., count value N) are compared (e.g., by comparator 210). If, at block 908, M and N are substantially equal (e.g., M and N are within THRESH of each other), then at block 910, it is determined that the current $SX_A$ is positive (e.g., being sourced to motor M). At block 912, the zero cross output signal, $ZXD_A$, is set to (or maintained at) a logic high value. At block 920, the count of up/down counter 204 (e.g., count value M) and the count of up/down counter 206 (e.g., count value N) are reset (e.g., by the RST signal) to a predetermined default value, such as zero. Processing continues to node 921 where blocks 922 and 928 are performed in parallel (e.g., blocks 922, 924 and 926 are performed in parallel with blocks 928, 930 and 932).

If, at block 908, M and N are not substantially equal, then at block 914, if M is greater than N plus the number of counts expected for 2 dead times, then at block 916, it is determined that the current $SX_A$ is negative (e.g., being sunk from motor M). At block 918, the zero cross output signal, $ZXD_A$, is set to (or maintained at) a logic low value. At block 920, the count of up/down counter 204 (e.g., count value M) and the count of up/down counter 206 (e.g., count value N) are reset (e.g., by the RST signal) to a predetermined default value, such as zero. Processing continues to node 921 where blocks 922 and 928 are performed in parallel (e.g., blocks 922, 924 and 926 are performed in parallel with blocks 928, 930 and 932).

If, at block 914, M is not greater than N plus the number of counts expected for 2 dead times, and M and N were not substantially equal at block 908, then processing continues to node 921 where blocks 922 and 928 are performed in parallel (e.g., blocks 922, 924 and 926 are performed in parallel with blocks 928, 930 and 932).

At node 921, blocks 922 and 928 are performed in parallel (e.g., blocks 922, 924 and 926 are performed in parallel with blocks 928, 930 and 932). At block 922, if the voltage of $SX_A$ is greater than (or equal to) the voltage of SX_REF, then at block 924, up/down counter 204 increments count signal M. Processing returns to block 904. If, at block 922, the voltage of $SX_A$ is less than the voltage of SX_REF, then at block 926, up/down counter 204 decrements count signal M. Processing returns to block 904. At block 928, if the $COMH_A$ signal is a logic high value (e.g., transistor Q1 is on), then at block 930, up/down counter 206 increments count signal N. Processing returns to block 904. If, at block 928, the $COMH_A$ signal is a logic low value (e.g., transistor Q1 is off), then at block 932, up/down counter 206 decrements count signal N. Processing returns to block 904.

Although described herein as detecting a zero crossing of a current signal, described embodiments could additionally or alternatively detect a zero crossing of a voltage signal using the techniques described herein.

Thus, described embodiments provide a motor driver with a zero crossing detector to detect when alternating current (AC) through a motor winding passes through zero (e.g., switches between a positive half-cycle and a negative half-cycle of the AC current). Typical motor drivers control a plurality of transistors arranged in one or more half-bridge control circuits to control current through the motor windings. Embodiments of the zero crossing detector can employ standard comparators since described embodiments do not detect small voltage differences (e.g., a single diode voltage drop) versus a large supply voltage, which would place strict requirements on the tolerances and accuracy of the components employed. Further, described embodiments do not monitor the current (or voltage) directly where the signal of interest is low in amplitude since the current (or voltage) is nearing zero at the detection point. Finally, described embodiments compare two counters after an entire pulse-width modulation (PWM) control period of the half-bridge circuits, thus making the zero crossing detection more robust by averaging out errors over time.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While electronic circuits might be in the form of analog blocks or digital blocks, it will be understood that analog blocks can be replaced by digital blocks (and vice versa) that perform the same or similar functions. Analog-to-digital or digital-to-analog conversions are not explicitly shown in the figures, but should be understood. In particular, it should be understood that a so-called comparator can be comprised of an analog comparator having a two state output signal indicative of an input signal being above or below a threshold level, or indicative of one input signal being above or below another input signal. However, the comparator can also be comprised of a digital circuit having an output signal with at least two states indicative of an input signal being above or below a threshold level (or indicative of one input signal being above or below another input signal), respectively, or a digital value above or below a digital threshold value or another digital value, respectively.

While the exemplary embodiments have been described with respect to processes of circuits, described embodiments might be implemented as a single integrated circuit, a multi-chip module, a single card, or a multi-card circuit pack. Further, as would be apparent to one skilled in the art, various functions of circuit elements might also be implemented as processing blocks in a software program. Such software might be employed in, for example, a digital signal processor, micro-controller, or general purpose computer.

Thus, described embodiments might be implemented in hardware, a combination of hardware and software, software, or software in execution by one or more processors.

Some embodiments might be implemented in the form of methods and apparatuses for practicing those methods. Described embodiments might also be implemented in the form of program code embodied in tangible media, such as magnetic recording media, hard drives, floppy diskettes, magnetic tape media, optical recording media, compact discs (CDs), digital versatile discs (DVDs), solid state memory, hybrid magnetic and solid state memory, or any other machine-readable storage medium, wherein, when the program code is loaded into and executed by a machine, such as a computer, the machine becomes an apparatus for practicing the claimed invention.

Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a processing device, the program code segments combine with the processor to provide a unique device that operates analogously to specific logic circuits. Such processing devices might include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments might also be implemented in the form of a bitstream or other sequence of signal values electrically or optically transmitted through a medium, stored magnetic-field variations in a magnetic recording medium, etc., generated using a method and/or an apparatus as recited in the claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments.

For purposes of this description, it is understood that all gates are powered from a fixed-voltage power domain (or domains) and ground unless shown otherwise. Accordingly, all digital signals generally have voltages that range from approximately ground potential to that of one of the power domains and transition (slew) quickly. However, and unless stated otherwise, ground may be considered a power source having a voltage of approximately zero volts, and a power source having any desired voltage might be substituted for ground. Therefore, all gates might be powered by at least two power sources, with the attendant digital signals therefrom having voltages that range between the approximate voltages of the power sources.

Transistors are typically shown as single devices for illustrative purposes. However, it is understood that transistors will have various sizes and characteristics and might be implemented as multiple transistors coupled in parallel to achieve desired electrical characteristics from the combination, such as a desired physical size (e.g., gate width and length) or operating characteristic (e.g., isolation, switching speed, threshold voltage, gain, etc.). Further, the illustrated transistors might be composite transistors.

Unless explicitly stated otherwise, each numerical value and range should be interpreted as being approximate as if the word "about", "substantially" or "approximately" preceded the value of the value or range.

It will be further understood that various changes in the details, materials, and arrangements of the parts that have been described and illustrated herein might be made by those skilled in the art without departing from the scope of the following claims.

We claim:

1. A driver circuit for driving a load, the driver circuit comprising:
   a gate driver for providing an associated control signal to each of one or more switching elements coupled to the driver circuit, a first one of the switching elements coupled between a high supply voltage and a switching node of the load, and a second one of the switching elements coupled between the switching node and a low supply voltage; and
   a zero crossing detector for detecting a zero crossing of a signal of the one or more switching elements and the load, the zero crossing detector comprising:
      a first counter coupled to the switching node, wherein the first counter is configured to count in a predetermined direction based on a detected voltage of the switching node;
      a second counter coupled to one of the control signals, wherein the second counter is configured to count in a predetermined direction based on a detected voltage of the control signal; and
      an output comparator coupled to the first counter and the second counter, the output comparator to generate a difference between a count value of the first counter and a count value of the second counter, wherein the zero crossing detector is configured to generate a zero crossing output signal based, at least in part, upon the difference.

2. The driver circuit of claim 1, wherein the driver circuit is implemented in a motor controller, and the load comprises a multi-phase motor.

3. The driver circuit of claim 2, wherein the zero crossing detector is coupled to a switching node of a first phase of the multi-phase motor.

4. The driver circuit of claim 2, comprising a plurality of zero crossing detectors, each zero crossing detector coupled to a switching node of an associated phase of the multi-phase motor.

5. The driver circuit of claim 2, wherein the one or more switching elements are configured in a plurality of half-bridge circuit branches, each branch associated with a given phase of the multi-phase motor, each branch comprising:
   a first switching element coupled between a high supply voltage and a switching node of the given phase, and a second switching element coupled between the switching node and a low supply voltage.

6. The driver circuit of claim 2, further comprising:
   a control signal generator to control a speed and a position of the multi-phase motor, based, at least in part, upon the zero crossing output signal.

7. The driver circuit of claim 6, wherein the control signal generator drives the multi-phase motor in a phase advance mode, the phase advance mode to reduce a back electromotive force of the motor and align a phase of the current through the load and a phase of a voltage applied to the load.

8. The driver circuit of claim 6, wherein the control signal generator determines, based at least in part upon the zero crossing output signal, a direction of motion of the multi-phase motor.

9. The driver circuit of claim 1, wherein the output comparator is configured to receive an adjustable threshold value, the adjustable threshold value to set a number of counts of at least one of the first counter and the second counter that occur before generating the zero crossing output signal.

10. The driver circuit of claim 1, wherein, during a dead time when the one or more switching elements are off, the first counter is configured to receive a signal indicative of the voltage of the switching node.

11. The driver circuit of claim 10, further comprising an input comparator coupled to the switching node and a threshold voltage, the input comparator configured to generate the signal indicative of the voltage of the switching node.

12. The driver circuit of claim 1, wherein the difference between the count value of the first counter and the count value of the second counter corresponds to a direction of motion of the multi-phase motor.

13. The driver circuit of claim 1, wherein the one or more switching elements each comprise a field effect transistor, and wherein the driver circuit is implemented in an integrated circuit.

14. The driver circuit of claim 1, wherein the zero crossing detector is configured to detect a zero crossing of a current through the one or more switching elements and the load.

15. The driver circuit of claim 14, wherein the one or more switching elements are internal to the integrated circuit.

16. The driver circuit of claim 14, wherein the one or more switching elements are external to the integrated circuit.

17. An electronic circuit for controlling operation of a multi-phase motor having a plurality of windings, the electronic circuit comprising:
   a gate driver for each phase of the multi-phase motor, the gate driver for providing a control signal to an associated half-bridge circuit branch, each branch comprising a first switching element coupled between a high supply voltage and a switching node of the given phase, and a second switching element coupled between the switching node and a low supply voltage; and
   a zero crossing detector for detecting a zero crossing of a current through the at least one winding of the multi-phase motor, the zero crossing detector comprising:
      a first counter coupled to the switching node, wherein the first counter is configured to count in a predetermined direction based on a detected voltage of the switching node; and
      a second counter coupled to one of the control signals, wherein the second counter is configured to count in a predetermined direction based on a detected voltage of the control signal;
      wherein the zero crossing detector is configured to generate a difference between a count value of the first counter and a count value of the second counter, wherein the zero crossing detector is configured to generate a zero crossing output signal based, at least in part, upon the difference.

18. The electronic circuit of claim 17, comprising a plurality of zero crossing detectors, each zero crossing detector associated with a given phase of the multi-phase motor.

19. The electronic circuit of claim 17, further comprising:
a control signal generator to control a speed and a position of the multi-phase motor, based, at least in part, upon the zero crossing output signal.

20. The electronic circuit of claim 19, wherein the control signal generator drives the multi-phase motor in a phase advance mode, the phase advance mode to reduce a back electromotive force of the motor and align a phase of the current through the load and a phase of a voltage applied to the load.

21. The electronic circuit of claim 19, wherein the control signal generator determines, based at least in part upon the zero crossing output signal, a direction of motion of the multi-phase motor.

22. The electronic circuit of claim 17, wherein the output comparator is configured to receive an adjustable threshold value, the adjustable threshold value to set a number of counts of at least one of the first counter and the second counter that occur before generating the zero crossing output signal.

23. The electronic circuit of claim 17, wherein, during a dead time when the one or more switching elements are off, the first counter is configured to receive a signal indicative of the voltage of the switching node.

24. The electronic circuit of claim 23, further comprising an input comparator coupled to the switching node and a threshold voltage, the input comparator configured to generate the signal indicative of the voltage of the switching node.

25. The electronic circuit of claim 17, wherein the difference between the count value of the first counter and the count value of the second counter corresponds to a direction of motion of the multi-phase motor.

26. The electronic circuit of claim 17, wherein the one or more switching elements each comprise a field effect transistor.

27. The electronic circuit of claim 17, wherein the electronic circuit is implemented in an integrated circuit.

28. The electronic circuit of claim 27, wherein the one or more switching elements are internal to the integrated circuit.

29. The electronic circuit of claim 27, wherein the one or more switching elements are external to the integrated circuit.

30. A method for driving a load by a driver circuit, the method comprising:
providing an associated control signal by a gate driver to each of one or more switching elements coupled to the driver circuit, a first one of the switching elements coupled between a high supply voltage and a switching node of the load, and a second one of the switching elements coupled between the switching node and a low supply voltage; and
detecting, by a zero crossing detector, a zero crossing of a signal of the one or more switching elements and the load by:
counting, by a first counter coupled to the switching node, in a predetermined direction based on a detected voltage of the switching node;
counting, by a second counter coupled to one of the control signals, in a predetermined direction based on a detected voltage of the control signal;
generating, by an output comparator coupled to the first counter and the second counter, a difference between a count value of the first counter and a count value of the second counter; and
generating a zero crossing output signal based, at least in part, upon the difference.

31. The method of claim 30, wherein the driver circuit is implemented in a motor controller, and the load comprises a multi-phase motor.

32. The method of claim 31, wherein the zero crossing detector is coupled to a switching node of a first phase of the multi-phase motor.

33. The method of claim 31, wherein the driver circuit comprises a plurality of zero crossing detectors, each zero crossing detector coupled to a switching node of an associated phase of the multi-phase motor.

34. The method of claim 31, wherein the one or more switching elements are configured in a plurality of half-bridge circuit branches, each branch associated with a given phase of the multi-phase motor, each branch comprising:
a first switching element coupled between a high supply voltage and a switching node of the given phase, and a second switching element coupled between the switching node and a low supply voltage.

35. The method of claim 31, further comprising:
controlling a speed and a position of the multi-phase motor based, at least in part, upon the zero crossing output signal.

36. The method of claim 35, further comprising:
driving the multi-phase motor in a phase advance mode, the phase advance mode to reduce a back electromotive force of the motor and align a phase of the current through the load and a phase of a voltage applied to the load.

37. The method of claim 35, further comprising:
determining, based at least in part upon the zero crossing output signal, a direction of motion of the multi-phase motor.

38. The method of claim 30, further comprising:
receiving, by the output comparator, an adjustable threshold value; and
setting, based upon the adjustable threshold value, a number of counts of at least one of the first counter and the second counter that occur before generating the zero crossing output signal.

39. The method of claim 30, further comprising:
during a dead time when the one or more switching elements are off, receiving, by the first counter, a signal indicative of the voltage of the switching node.

40. The method of claim 39, further comprising:
generating the signal indicative of the voltage of the switching node by an input comparator coupled to the switching node and a threshold voltage.

41. The method of claim 30, wherein the difference between the count value of the first counter and the count value of the second counter corresponds to a direction of motion of the multi-phase motor.

42. The method of claim 30, wherein the one or more switching elements each comprise a field effect transistor, and wherein the electronic circuit is implemented in an integrated circuit.

43. The method of claim 42, wherein the one or more switching elements are internal to the integrated circuit.

44. The method of claim 42, wherein the one or more switching elements are external to the integrated circuit.

45. The method of claim 30, wherein the zero crossing detector detects a zero crossing of a current through the one or more switching elements and the load.

46. A method of detecting a zero crossing of a current through the at least one winding of a multi-phase motor having a plurality of windings, the method comprising:

providing a control signal, by a gate driver of a motor controller coupled to the multi-phase motor, to an associated half-bridge circuit branch comprising a first switching element coupled between a high supply voltage and a switching node, and a second switching element coupled between the switching node and a low supply voltage;

counting, by a first counter coupled to the switching node, in a predetermined direction based on a detected voltage of the switching node;

counting, by a second counter coupled to the control signal, in a predetermined direction based on a detected voltage of the control signal;

generating a difference between a count value of the first counter and a count value of the second counter; and generating a zero crossing output signal based, at least in part, upon the difference.

* * * * *

UNITED STATES PATENT AND TRADEMARK OFFICE
CERTIFICATE OF CORRECTION

PATENT NO. : 9,780,706 B2  
APPLICATION NO. : 15/016351  
DATED : October 3, 2017  
INVENTOR(S) : Gianluca Allegrini et al.

Page 1 of 1

It is certified that error appears in the above-identified patent and that said Letters Patent is hereby corrected as shown below:

Column 9, Line 18, delete "ZXDA" and replace with --$ZXD_A$--

Column 12, Line 59, delete "Acount" and replace with --$\Delta$count--

Column 13, Line 8, delete "Acount" and replace with --$\Delta$count--

Signed and Sealed this  
First Day of May, 2018

Andrei Iancu  
*Director of the United States Patent and Trademark Office*